United States Patent [19]
Ulrich

[11] 3,986,601
[45] Oct. 19, 1976

[54] AERIAL TRANSPORT SYSTEM

[76] Inventor: Udo Ulrich, Elsterweg 12, Lechenich, Bundesrepublik, Germany

[22] Filed: Dec. 23, 1974

[21] Appl. No.: 535,447

[52] U.S. Cl. ............................. 198/703; 198/600; 104/173 R; 198/707; 198/795
[51] Int. Cl.² ........................................ B65G 17/12
[58] Field of Search ........... 198/147, 151, 140, 141, 198/145, 146, 203, 179; 104/112, 173, 180, 214

[56] References Cited
UNITED STATES PATENTS

| | | | |
|---|---|---|---|
| 906,858 | 12/1908 | Blum | 198/151 X |
| 1,090,012 | 3/1914 | Bauerle | 198/140 |
| 1,363,533 | 12/1920 | Roe | 198/140 |
| 2,809,744 | 10/1957 | Hapman | 198/203 |
| 3,332,535 | 7/1967 | Hubert | 198/147 X |

FOREIGN PATENTS OR APPLICATIONS

| | | | |
|---|---|---|---|
| 697,694 | 6/1930 | France | 198/151 |

*Primary Examiner*—L. J. Paperner
*Assistant Examiner*—James M. Slattery

[57] ABSTRACT

An aerial transport system for continuously loading, conveying, and unloading of materials. The system includes a plurality of interconnected transport containers which may be moved by one or more traction cables in an endless path along pairs of suspended support cables. Guide rails are provided at the opposite terminal ends of the system for reliably reversing direction of travel of the containers. An auxiliary loop of track is provided adjacent one of the terminal ends for accommodating selected containers for servicing and repair without interfering with the normal conveyance of other containers about the system.

9 Claims, 7 Drawing Figures

AERIAL TRANSPORT SYSTEM

DESCRIPTION OF THE INVENTION

The present invention relates generally to conveyors, and more particularly, to aerial transport systems of the type comprising one or more suspended support cables upon which containers are conveyed for substantially continuous loading, conveyance, and unloading of materials.

Heretofore, such aerial transport systems frequently have experienced operating problems. Since the cables upon which the conveyors travel generally are supported in suspended fashion, when the span between the supports is of substantial length the resulting sag of the cables makes it difficult to safely move the conveyors along the cables at continuous and rapid speed. In prior aerial transport conveyors, the unloading of the transport containers or the parking of some of the containers for service or reloading also has frequently impaired or disrupted movement of other containers, and thus further impeded the efficiency of the overall system.

It is an object of the present invention to provide a relatively simple aerial transport system that is adapted for more reliable and efficient operation.

Another object is to provide an aerial transport system as characterized above that is well suited for use in transporting materials over relatively long distances.

A further object is to provide such an aerial transport system with means for reliably unloading containers and reversing their movement for return to a loading station.

Still another object is to provide an aerial transport system of the above kind that is adapted to accommodate containers for service or repair without interfering with normal conveyance of other containers.

Other objects and advantages of the invention will become apparent upon reading the following detailed description and upon reference to the drawings, in which.

Figure 4:
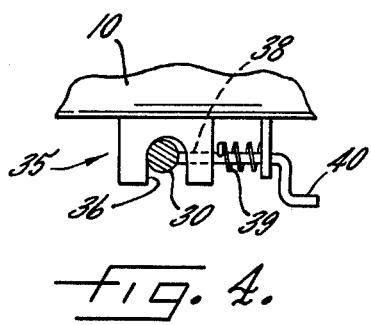
FIG. 4 is an enlarged fragmentary section of the device for clamping each transport container to its traction cable.
Figure 1:
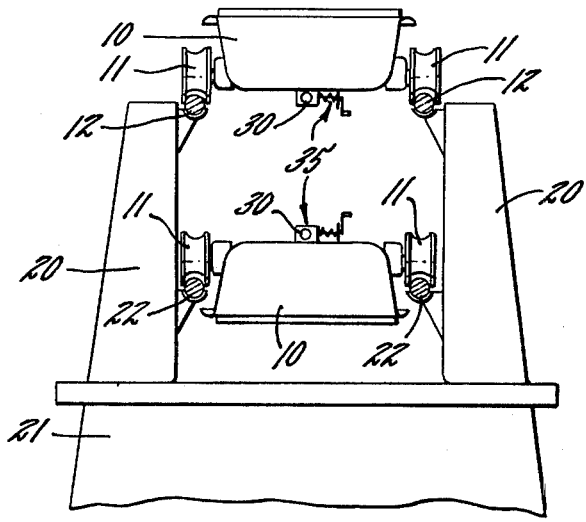
FIG. 1 is a vertical section of an aerial transport system embodying the present invention.
Figure 2:
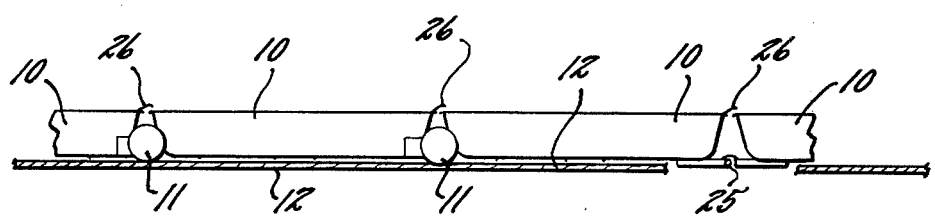
FIG. 2 is a side elevation of the upper part of a horizontal section of the transport system shown in FIG. 1.

While the invention is susceptible of various modifications and alternative constructions, a certain illustrative embodiment has been shown in the drawings, and will be described below in detail. It should be understood, however, that there is no intention to limit the invention to the particular form disclosed herein, but on the contrary, the intention is to cover all modifications, alternative constructions, and equivalents falling within the spirit and scope of the invention.

Figure 3:
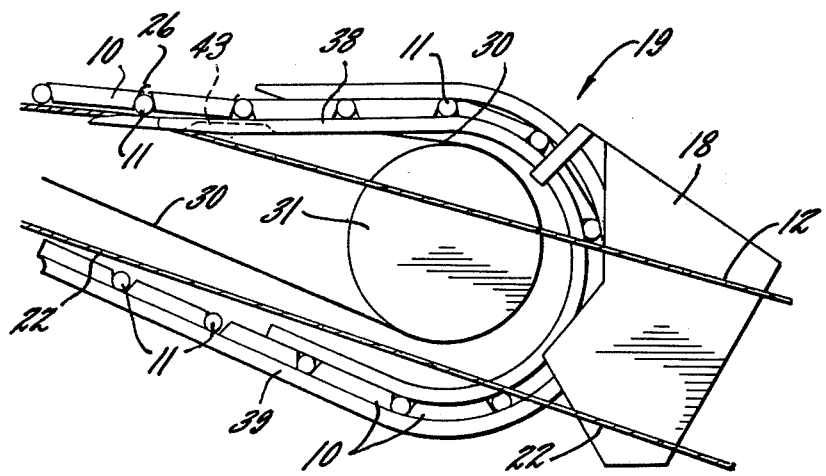
FIG. 3 is a side elevation of a terminal end of the transport system and the unloading chute at that point.

Referring now more particularly to the drawings, there is shown an illustrative aerial transport system embodying the present invention. The transport system includes a plurality of transport containers 10 coupled in end to end relation to form a chain. The containers 10 each have rollers 11 to permit their movement on two parallel support cables 12. The support cables 12 extend from a loading station 15 (FIG. 7) near one terminal end 16 of the system to a discharge station 18 at the other terminal end 19 (FIG. 3). The support cables 12 in this case are suspended between pairs of upstanding arms 20 which in turn are mounted on elevation platforms 21. Such cable supporting arms 21 are located at suitable longitudinally spaced intervals so as to prevent excessive sag of the cables. A second pair of cables 22 also are provided immediately below the first pair for carrying unloaded containers 10 during their return trip to the loading zone.

The containers 10 are interconnected in series by hinge couplings 25 that permit relative pivotable movement of adjacent containers about the axis of the respective hinge. The containers 10 preferably are connected to form an endless chain for continuous conveyor operation as will become apparent, although they may be connected to form chains of a determined length. The containers in this case are of an open top type and may be subdivided by partitions to assure safe conveyance of materials, such as liquids, that might otherwise more easily slip from the container during their movement. The space between adjacent containers is covered by a plate 26 extending forwardly from the front of each container. Such plate 26, which may be either fixed or hinged to the container, prevents material from dropping between adjacent containers during loading and also serves to guide the discharge of material during unloading.

In accordance with one aspect of the invention, means are provided for reliably and efficiently moving the containers in an endless path along the support cables. To this end, a traction cable 30 is trained about suitable rolls 31, 32 so that an upper pass line of the traction cable is disposed substantially between the upper pair of support cables 12 and a lower pass line is between the return support cables 22. A clamp 35 is provided on the underside of each container 10 for releasably securing the respective container to the traction cable 30. To drive the traction cable and thereby move the containers along the support cables, at least one of the rolls 31, 32 is power driven by a suitable motor means.

The traction cable clamps 35 may be of any conventional type that are normally biased in a closed condition for engaging the cable 30, but may be selectively opened to permit release and withdrawal of the cable. In the illustrated clamp shown in FIG. 4, the clamps include a slot 36 within which the cable is normally disposed. A clamping pin 38 extends through the side of said clamp and is urged into the slot by a spring 39 for engaging the cable 30. The pin 38 has a depending arm 40 which may be forced outwardly to withdraw the pin from the slot 36 against the biasing force of the spring to release the cable.

In carrying out the invention, means are provided for successively disengaging the containers from the traction cable at the terminal ends of the system, reversing directional movement of the containers, and re-engaging the containers with the traction cable for movement in a return direction. As shown in FIG. 3, as the containers 10 approach the traction cable drive pulley 31 their wheels 11 move on to track rails 38 that have a generally U-shape extending from the upper support cables 12 to the lower support cables 22. Counter rails 39 are provided in closely spaced relation to the rails 38 for positively retaining the rollers as the containers move to an upside down position while proceeding about the loop. As each container rolls on to the guide rails 38 it passes over a stationary cam member 43 that urges the clamp handle 40 of the passing container in an outward direction to unclamp the container from the traction cable 30 to permit it to proceed about the guide rails 38, 39 which are spaced a distance outwardly from the traction cable. Since other containers in the chain remain coupled to the traction cable 30, the uncoupled containers will continue to be moved about the guide rails 38, 39 under the power of the traction cable 30.

As the containers proceed around the guide rails at the discharge end of the system the contents of each container is discharged into a chute 18 disposed immediately adjacent the guide rails 38, 39. The plates 26 at the forward end of each container guide the contents into the chute during such dumping action. As the containers proceed further about the guide rails 38, 39 they come into close relation to the lower pass of the moving traction cable 30. An appropriate camming member, (not shown), similar to the member 43 may be provided at that point for again urging the clamp 35 of each container to an open cable receiving position and after the respective container has passed such clamping member the clamp will re-engage the cable under the biasing action of its spring so that the container again is directly powered by the traction cable.

Figure 5:
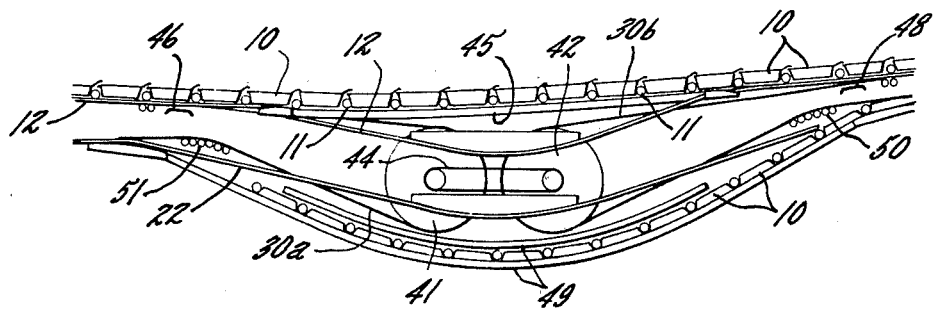
FIG. 5 is a side elevation of an intermediate driving station that may be utilized in a transport system of the type shown in FIG. 1.

In accordance with another aspect of the invention, intermediate driving stations may be provided to assist in moving the traction cable and the containers carried thereby over distances of substantial length. As shown in FIG. 5, the traction cable 30 may comprise a pair of elongated cables 30a, 30b that are arranged in end to end relation and the pulleys 41, 42 about which the respective cables are trained both may be powered such that the upper pass of each traction cable moves in a common direction. The illustrated pulleys 41, 42 are pulled together by a tension chain 44 so as to maintain the respective traction cables 30a, 30b in a taut condition. To facilitate movement of the containers over the junction between the traction cables 30a, 30b guide rails 45 are provided about the pulleys 41, 42 for receiving the wheels of the containers 10 as they pass over the junction. A camming member 46 is disposed at the entrance to the rails 45 for disconnecting the successive container clamps from the traction cable 30a as it passes over the pulleys and a second camming member 48 is provided at the end of the guide rails 45 for again opening the clamps to permit re-engagement with the traction cable 30b. Below the pulleys 41, 42 sets of spaced guide rails 49 are disposed for receiving and retaining the wheels of containers 10 as they pass the junction of the traction cables 30a, 30b during movement in the return direction. Camming devices similar to those described above are provided for disengaging the containers from the traction cable when passing along the guide rails 49. Positioning rollers 50, and 51 train the traction cable such that it is readily engageable by the container clamps as it is entering and leaving the guide rails 49.

Figure 6:
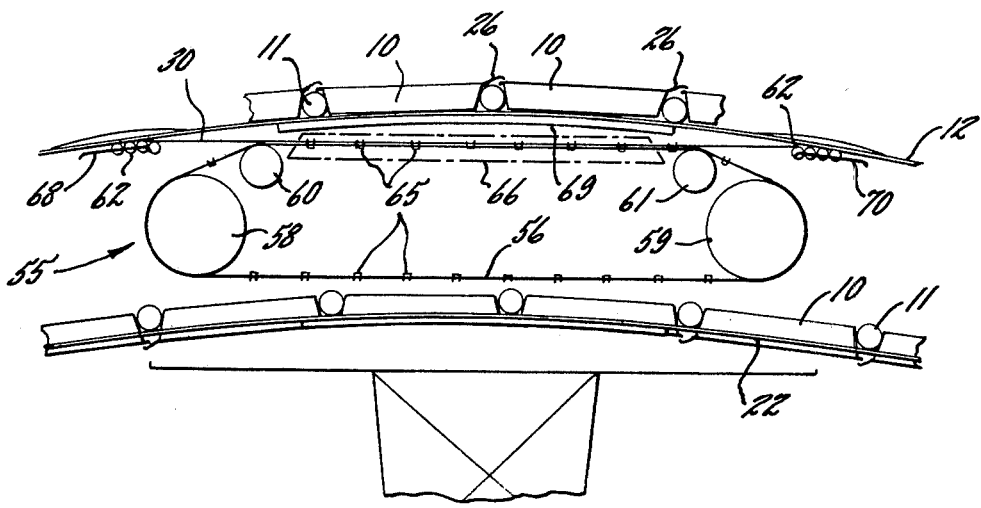
FIG. 6 is another form of an intermediate driving station at a horizontal section of the system.

An alternative form of intermediate driving station 55 at any straight section of the traction cable 30 is shown in FIG. 6. The intermediate driving station 55 includes an endless chain 56 trained around drive rolls 58, 59 and positioning rolls 60, 61 so as to define an upper pass line adjacent the passing traction cable 30. Positioning rollers 62 again insure accurate location of the moving traction cable. The drive chain 56 has a plurality of spaced clamps 65 for successively engaging the traction cable as the clamps arrive at the upper pass line. The clamps may be of any conventional type that are normally biased to an open position but which may be cammed to a closed position for engaging the cable. In the illustrated embodiment, the clamps while in a normally open position receive the traction cable as they arrive at the upper pass line. The clamps then engage a stationary camming member 66 and are closed to positively engage the traction cable so that driving movement of the chain is transmitted to the traction cable. The clamps 65 remain engaged with a camming member 66, and thus the traction cable 30, during their movement along the upper pass line and after passing the end of the camming member 66 are again permitted to open to release the traction cable. As the containers 10 pass over the intermediate drive station 55, they may be successively disconnected from the traction cable by means of a cam member 68, moved along guide rails 69 over the drive station, and then reconnected to the traction cable 30 through actuation of the clamp by a camming member 70. It will be appreciated that the drive chain 56 of the intermediate drive station 55 may similarly be used to break movement of the traction cable, such as, for example, when the transfer system is located on a steep incline.

Figure 7:
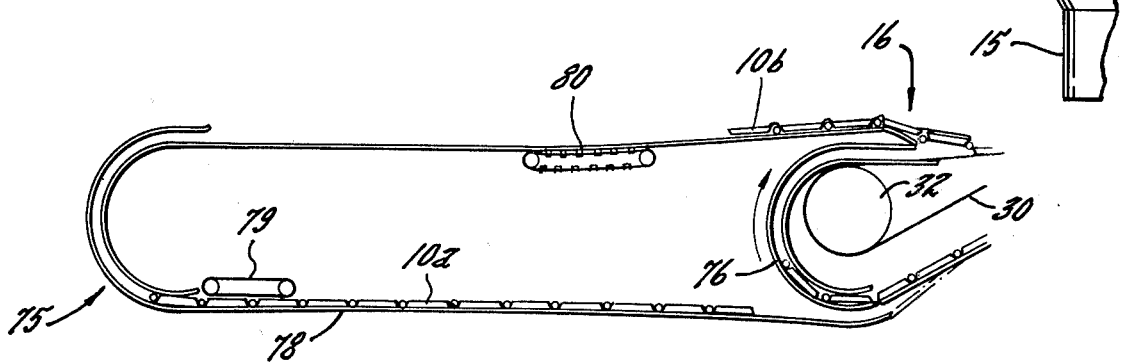
FIG. 7 is a side elevation of an auxiliary parking and servicing loop with one series of containers shown parked and another series shown re-entering the main conveyor system.

Pursuant to still another aspect of the invention, an auxiliary parking loop is provided adjacent the terminal end of the system for receiving selected containers for service or repair without interfering with the normal conveyance of the remaining containers. As shown in FIG. 7, an elongated track section 75 is provided adjacent the terminal end 16 of the transfer system and it has an open end surrounding in close relation to direction reversing guide rails 76 at that end. After containers 10 are disconnected from the traction cable 30 as they begin to proceed about the guide rail 76, they may be selectively directed onto a lower pass line 78 of the auxiliary loop 75. A chain 10a of containers is shown in FIG. 7 in a parked position in the auxiliary loop where they may be cleaned, lubricated or otherwise serviced without interfering with the conveyance of other containers about the conveyor system. Upon completion of the maintenance work, the chain may be returned to the conveyor system by suitable chain drives 79, 80 that may be selectively operated to move the chain of containers along the auxiliary loop until the forward end of such chain can be reconnected to the traction cable 30. Such a serviced chain 10b of containers is shown just leaving the loop in FIG. 7.

In view of the foregoing, it can be seen that the aerial transport system of the present invention is well suited for continuous and reliable transfer of containers over long distances between a loading zone and a discharge zone. The aerial transport system also is adapted to accommodate containers for servicing and repair without substantially interfering with the normal conveyance of other containers.

I claim as my invention:

1. An aerial transport system for continuously loading, conveying, and unloading material comprising pairs of parallel vertically arranged support cables, means for supporting said cables in suspension, a plurality of transport containers releasably coupled in end to end relation to form a chain, said containers having rollers for supporting said containers on said support cables for rolling movement along said cables, means at opposite terminal ends of said transport system for successively guiding movement of said containers from one pair of said support cables to the other pair of support cables and reversing their direction of movement, at least two endless traction cables which each form an elongated loop, means releasably connecting said traction cables to said containers, drive means for moving said traction cables and causing said containers to travel along said support cables, said traction cables being positioned in end to end relation so that an upper pass line of each loop moves in a common direction, means for guiding movement of said containers along said pass line from one said traction cable to the other, means for successively disconnecting said containers from said one traction cable and reconnecting said containers to the other traction cables as they pass from one to the other, and rigid guide means for tipping said containers at a predetermined unloading station to discharge their contents.

2. The aerial transport system of claim 1 in which said guide means includes pairs of radially spaced U-shaped rails that define tracks for receiving said container rollers and positively guiding movement of said containers through a vertical loop in which their direction of movement is reversed.

3. The aerial transport system of claim 2 including means for depositing materials into said containers as they proceed along said upper support cables, and a discharge chute adjacent the guide rails at one terminal end of said system for receiving materials tipped from said containers.

4. The aerial transport system of claim 3 including means for disconnecting said containers from said traction cables as they are moved onto said guide rails, and means for reconnecting said containers to said traction cables after having completed travel about said guide rails.

5. The aerial transport system of claim 4 in which said means for releasably connecting said containers to said traction cables includes a normally closed spring biased clamp mounted on the underside of each container, said means for disconnecting said traction cable includes a stationary actuating member disposed in the line of travel of said containers at the entrance to said guide rails for biasing said coupling means to an open cable releasing position.

6. The aerial transport system of claim 3 in which each said traction cable is an endless cable trained about at least two rolls, and at least one of said rolls for each traction cable is power driven.

7. The aerial transport system of claim 6 in which said drive means includes an intermediate drive located between the terminal ends of said transport system, said intermediate drive comprising an endless power driven chain disposed about rolls to define a pass line adjacent a substantially straight section of one of said traction cables, and means on said chain for releasably engaging said one traction cable as it comes into adjacent relation with said traction cable whereby said chain imparts forward movement to said traction cable.

8. The aerial transport system of claim 3 wherein each said container includes a cover plate extending from the forward end of said container to the immediately adjacent container whereby space between said container is abridged.

9. An aerial transport system for continuously loading, conveying, and unloading material comprising pairs of parallel vertically arranged support cables, means for supporting said cables in suspension, a plurality of transport containers releasably coupled in end to end relation to form a chain, said containers having rollers for supporting said containers on said support cables for rolling movement along said cables, a traction cable and means releasably connecting said traction cable to each of said containers, drive means for moving said traction cable and causing said containers to travel along said support cables, means at opposite terminal ends of said transport system for successively guiding movement of said containers from one pair of said support cables to the other pair of support cables and reversing their direction of movement, rigid guide means for tipping said containers at a predetermined unloading station to discharge their contents, and an auxiliary loop of track having one end which is open and in close surrounding relation to a terminal end of said system for selectively receiving some of said containers for servicing without interfering with the normal conveyance of other of said containers in said endless path.

* * * * *